(Model.)

T. H. McCRAY.
DRIVE CHAIN.

No. 403,127. Patented May 14, 1889.

Witnesses:
Chas. E. Gaylord.
Clifford N. White.

Inventor:
Thomas H. McCray,
By Charles T. Brown,
Atty.

N. PETERS, Photo-Lithographer, Washington, D. C.

UNITED STATES PATENT OFFICE.

THOMAS H. McCRAY, OF CHICAGO, ILLINOIS, ASSIGNOR OF ONE-HALF TO ALEXANDER H. GUNN, OF SAME PLACE.

DRIVE-CHAIN.

SPECIFICATION forming part of Letters Patent No. 403,127, dated May 14, 1889.

Application filed September 3, 1888. Serial No. 284,395. (Model.)

*To all whom it may concern:*

Be it known that I, THOMAS H. McCRAY, a citizen of the United States, residing at Chicago, in the county of Cook and State of Illinois, have invented certain new and useful Improvements in Drive-Chain Links, of which the following is a specification.

I am aware that drive-chain links of various designs have been heretofore made, and I do not therefore claim, broadly, drive-chain links; but, so far as I am aware, a drive-chain link like the one invented by me and herein described has never been made.

My invention relates to metal links formed of cast or wrought metal adapted to form part of a detachable chain; and the purpose of my invention is to obtain a drive-chain the alternate links of which shall be formed of a rectangular link having round end bars, and a link composed of two pieces of cast or wrought metal, (I prefer ductile sheet metal,) each of said pieces having a hook at each end thereof, the hook at one end of each of said pieces being larger than the hook at the other end thereof, and the larger hook on each piece fitting over the smaller hook on the other piece in a manner hereinafter fully described. By this method of constructing the last-described link I am able to obtain a drive-chain having but two different kinds of parts, although each two links adjacent of the drive-chain formed thereby are composed of three parts or separate pieces, the two of said pieces forming one of said adjacent links being, as hereinbefore stated, duplicates.

Another and further purpose of my invention, constituting an additional feature thereof, is to obtain a drive-chain in which the parts most subject to wear in the ordinary use thereof shall be protected from dust, grit, or other like substances by a lock and guard placed in one of said links. The said lock and guard forms also, in connection with the link within which it is placed, a receptacle suitable for the placing therein of porous material suitably saturated with a lubricant, or for the placing therein of a proper lubricant without such porous material, as preferred.

I have illustrated my invention by the drawings accompanying and forming a part hereof, in which—

Figure 1:
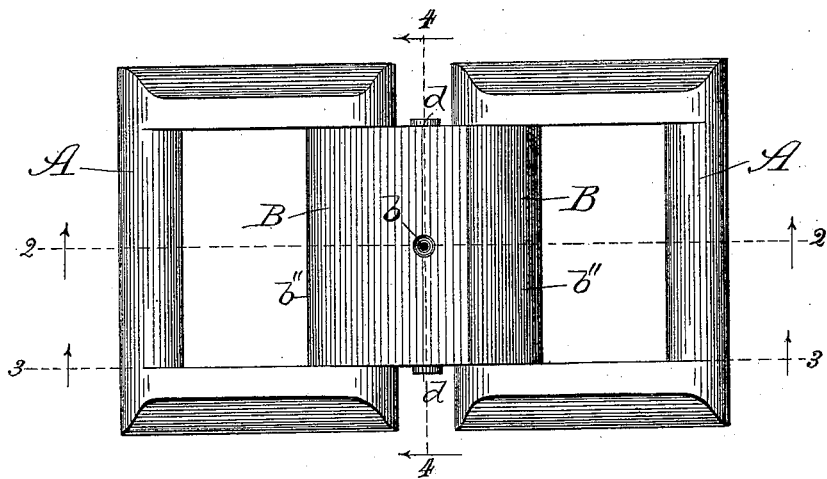
Figure 2:
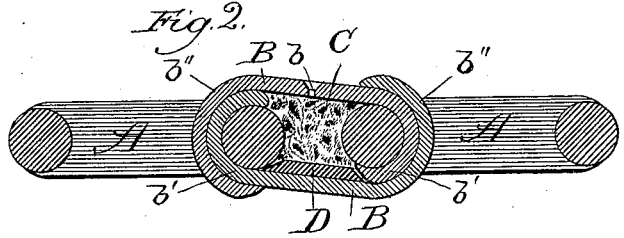
Figure 3:
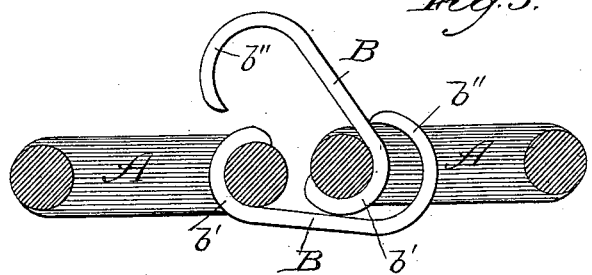
Figure 4:
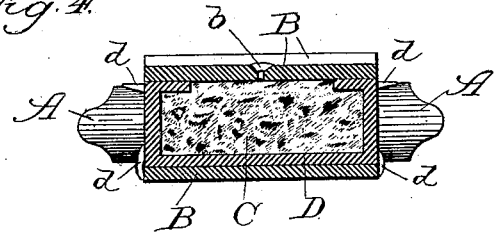

Figure 1 is a plan view of my invention. Fig. 2 is a cross-section thereof on line 2 2 of Fig. 1. Fig. 3 is a cross-section of the rectangular links forming a part of my invention on line 3 3 of Fig. 1, and an elevation of the link formed by the two pieces hereinbefore referred to. Fig. 3 illustrates the said link about to be formed by the placing together of the two pieces constituting said link. Fig. 4 is a cross-section on line 4 4 of Fig. 1.

Like letters refer to like parts throughout the several views.

A is a rectangular link having round end bars.

B B are hook-shaped pieces forming a second link adapted to engage with link A.

$b$ is a lubricating-hole in piece B.

$b'$ is a hook on one end of piece B, and $b''$ is a larger hook at the other end thereof. Hook $b''$ is sufficiently large to fit over hook $b'$, as illustrated in Fig. 2.

C is porous material placed in the link formed of pieces B B.

D is a lock-guard which slides into the link formed of pieces B B, and between the round ends of link A.

$d\ d$ are ears on lock-guard D, formed of ductile material, and are turned downward to retain lock-guard D in position.

The manner in which a chain composed of my improved drive-chain links is built up is as follows:

The round bar at the end of rectangular link A is placed in hook $b'$ of one piece B, in the manner illustrated in Fig. 3. A second piece B, also having in hook $b'$ thereon an end bar of a second rectangular link A, is placed in the opening between the two hooks on the first-named piece B, as illustrated by piece B to the right in Fig. 3, and the end hook $b''$ thereof is brought downward over and outside of hook $b'$ on said first-named piece B. The rectangular links A A are then drawn apart or the chain stretched, and pieces B B move longitudinally into position, as illustrated in Figs. 1 and 2.

For many purposes the link belt or drive-chain thus constructed is all that is required; but to obtain a belt adapted for use where grit, sand, or other like substances are likely to interfere with the working thereof, or to cause great wear thereon, lock-guard D is required to complete the drive-chain, and in such cases lock-guard D, having placed therein porous material, C, is slid into place in the link formed by pieces B B, and between the end bars of links A A, and secured by bending ears $d$ $d$ against the end thereof. In Fig. 4 two of these ears $d$ $d$ $d$ $d$ are shown as first formed, and two are shown as bent against lock-guard D, holding it in place. No exact number of ears $d$ $d$ is required, of course, provided there be one at each end of lock-guard D to hold it from sliding in either direction.

Any lubricating material may be placed upon porous material, C, and the saturation of said porous material thereby may be maintained through lubricating-hole $b$.

Pieces B B, as hereinbefore suggested, may be made of wrought ductile material. I obtain thereby a much smoother surface against which the end bars of links A A may turn than where said pieces B B are of cast metal.

The herein-described lock, forming a closed receptacle suitable for the placing therein of lubricating material, is described and claimed in application No. 284,396, filed by me September 3, 1888, for a patent for drive-chains, and is not claimed as a material part of this invention.

Having thus described my invention, what I claim, and desire to secure by Letters Patent, is—

1. A coupler for drive-chains, composed of duplicate C-shaped pieces, substantially the width of the sprocket-openings of the links, each of said pieces having a hook at one end thereof and a larger hook at the other end thereof, in combination with and adapted to engage the links of a chain by drawing the larger of said hooks over the smaller thereof, in substantially the manner and for the purposes described.

2. In a drive-chain link, the combination of a metal half-link formed of a piece of metal having a hook at one end thereof and a larger hook at the other end thereof, with a like half-link having like hooks thereon, the larger of said hooks being adapted to fit over the smaller thereof, and forming a link adapted to receive the end bars of adjacent rectangular links, and the lock-guard adapted to slide in place in the link formed by said half-links and between the end bars of said rectangular links, all substantially as described.

THOMAS H. McCRAY.

Witnesses:
ALEX. H. GUNN,
CHARLES T. BROWN.